United States Patent
Ackerman

(10) Patent No.: US 8,352,927 B2
(45) Date of Patent: Jan. 8, 2013

(54) COMPUTER METHOD AND APPARATUS FOR AUTOMATING TRANSLATION TO A MODELING LANGUAGE

(75) Inventor: Lee Murray Ackerman, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 12/604,272

(22) Filed: Oct. 22, 2009

(65) Prior Publication Data

US 2010/0042969 A1     Feb. 18, 2010

Related U.S. Application Data

(63) Continuation of application No. 11/000,552, filed on Dec. 1, 2004, now abandoned.

(51) Int. Cl.
    *G06F 9/45*     (2006.01)
    *G06F 9/44*     (2006.01)
    *G09B 19/00*    (2006.01)
(52) U.S. Cl. ......... 717/137; 717/105; 717/109; 434/118
(58) Field of Classification Search ............... 717/105
    See application file for complete search history.

(56) References Cited

U.S. PATENT DOCUMENTS

| | | | |
|---|---|---|---|
| 5,421,730 A * | 6/1995 | Lasker et al. | ........... 434/118 |
| 6,018,627 A | 1/2000 | Iyengar et al. | |
| 6,233,726 B1 | 5/2001 | Bowman et al. | |
| 6,502,102 B1 | 12/2002 | Haswell et al. | |
| 6,539,374 B2 | 3/2003 | Jung | |
| 6,804,686 B1 | 10/2004 | Stone et al. | |
| 2002/0198994 A1 | 12/2002 | Patton et al. | |
| 2004/0034846 A1 | 2/2004 | Ortal et al. | |

OTHER PUBLICATIONS

Freeza, S. and Anderson, W., "Interactive Exercises to Support Effective Learning of UML Structural Modeling," IEEE, 36th ASEE/IEEE Frontiers in Education Conference, Oct. 31, 2006.

* cited by examiner

*Primary Examiner* — James D Rutten
(74) *Attorney, Agent, or Firm* — Hamilton, Brook, Smith & Reynolds, P.C.

(57) ABSTRACT

Method and apparatus for automating translation of language specific constructs to UML (Unified Modeling Language) during wizard workflow. The invention provides an integration of UML mapping within the wizards that are available within integrated development environments (IDE's). As the user specifies the language specific details within a wizard, the appropriate corresponding UML element (depiction) is drawn and displayed within the wizard. This provides a user with an automated visual depiction of his work utilizing UML and yet allows him to work in the programming language of the wizard. Further, this allows the user to learn UML. Other modeling languages may be applied.

23 Claims, 5 Drawing Sheets

New Java Class

Java Class
Create a new Java class.

Source Folder: Patent [Browse...]
Package: com.rational.example [Browse...]
☐ Enclosing type: [Browse...]

Name: 25→ HourlyEmployee
Modifiers: ⦿ public ○ default ○ private ○ protected
  ☐ abstract ☐ final ☐ static
Superclass: java.lang.Object [Browse...]
Interfaces: [Add...] [Remove]

Which method stubs would you like to create?
☐ public static void main(String [] args)
☐ Constructors from superclass
☒ Inherited abstract methods

23

<<JavaClass>>
ⓒ HourlyEmployee  ~31

[Finish] [Cancel]

COMPUTER METHOD AND APPARATUS FOR AUTOMATING TRANSLATION TO A MODELING LANGUAGE

CROSS REFERENCE TO RELATED APPLICATION

This application is a continuation of U.S. application Ser. No. 11/000,552, filed Dec. 1, 2004.

The entire teachings of the above application(s) are incorporated herein by reference.

BACKGROUND

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and Associates' Object Modeling Technique (OMT);

the Object Oriented Software Engineering (OOSE) method by Ivar Jacobson; and the Unified Modeling Language (UML) which combines some of the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

Although UML has proven itself as a way to visualize and model systems—it still is not utilized by all practitioners. For many, once they are familiar with a specific implementation language, it seems difficult to invest additional time learning another language (UML). A solution is needed to lower the investment needed to incorporate UML as part of a user's skillset.

BRIEF SUMMARY

The present invention addresses the foregoing problems of the prior art. In particular, the present invention provides a computer method and apparatus that automates (and effectively teaches) translation of implementation language-specific constructs to UML (or other modeling language) during wizard workflow.

In a preferred embodiment, the invention method includes:

(a) using a wizard for specifying language-specific constructs in a respective implementation language;

(b) from the wizard, generating code in the respective implementation language;

(c) mapping from the generated code to a modeling language (e.g., UML), and producing, in terms of the modeling language, a depiction of the generated code; and (d) displaying the produced depiction on screens of the wizard, including displaying updates of the depiction throughout user input into the wizard. Alternatively, displaying is upon user command within or outside of the wizard.

The displaying of the produced depiction and updates thereto, during, throughout and/or outside of the workflow of the wizard, assists the user in learning the modeling language. As such, the present invention provides a method and means (system) for effectively teaching the modeling language to users.

BRIEF DESCRIPTION OF THE SEVERAL VIEWS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2 and 3 are schematic views of a Wizard with UML visualization pane in the embodiment of FIG. 1.

DETAILED DESCRIPTION

With the present invention, Applicant provides an integration of UML within the wizards that are available within integrated development environments (IDE's). In the resulting system as the user specifies the language specific details within a wizard, the appropriate UML elements are drawn and displayed for him within the wizard.

The advantage of this solution is that it provides a user with an automated visual depiction of his work utilizing UML and yet allows him to work in the programming language where he has made a learning investment. The positive results of this scenario are that the user consequently and eventually learns UML and is also given a visualization of his work.

For example, when creating an Enterprise JavaBean, a user provides details on a number of aspects of the EJB such as the type of bean, the bean name, the superclass of the bean, the home and remote interfaces, etc. Currently an alternative approach in tools such as XDE, is that the user can draw the solution using UML—and rather than enter the details in the wizard, he would draw the details in a diagram. This requires the user to understand both Java and UML as he needs to translate the concepts that he understands from Java (bean type, superclass, home interface, etc.) into its UML representation. For experienced UML and Java users, this is possible and an acceptable workflow. For those new to UML and unsure of the mapping between UML and Java—it is not a workflow that is likely to lead to success. A user will become frustrated with the lack of automated support describing the mapping between the two languages, and then avoid the usage of UML and just proceed with working in Java. As a result, the user does not learn how to use UML nor does he receive any of the benefits of working with UML.

Figure 1:
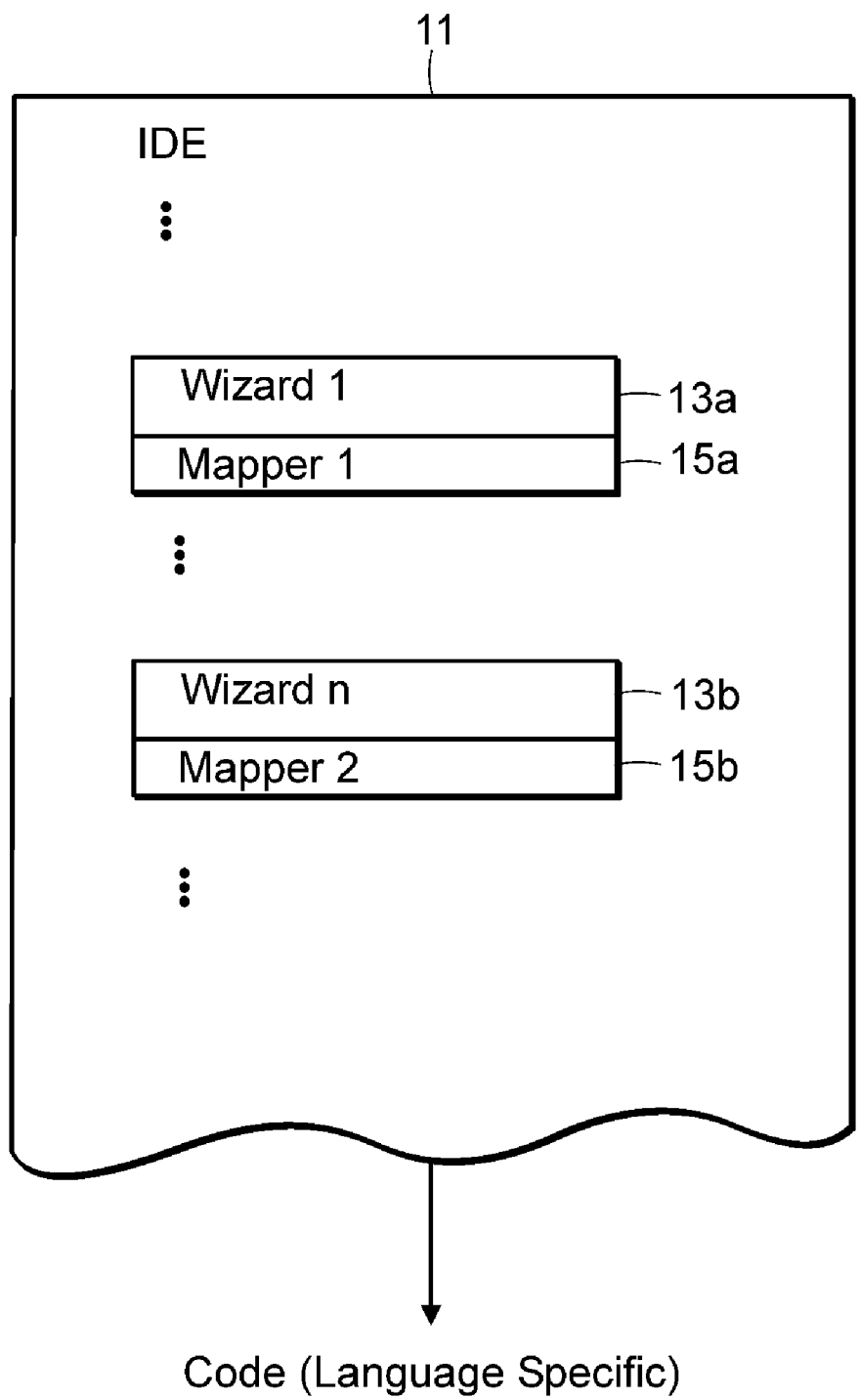
FIG. 1 is a block diagram of a preferred embodiment of the present invention.
Figure 3:
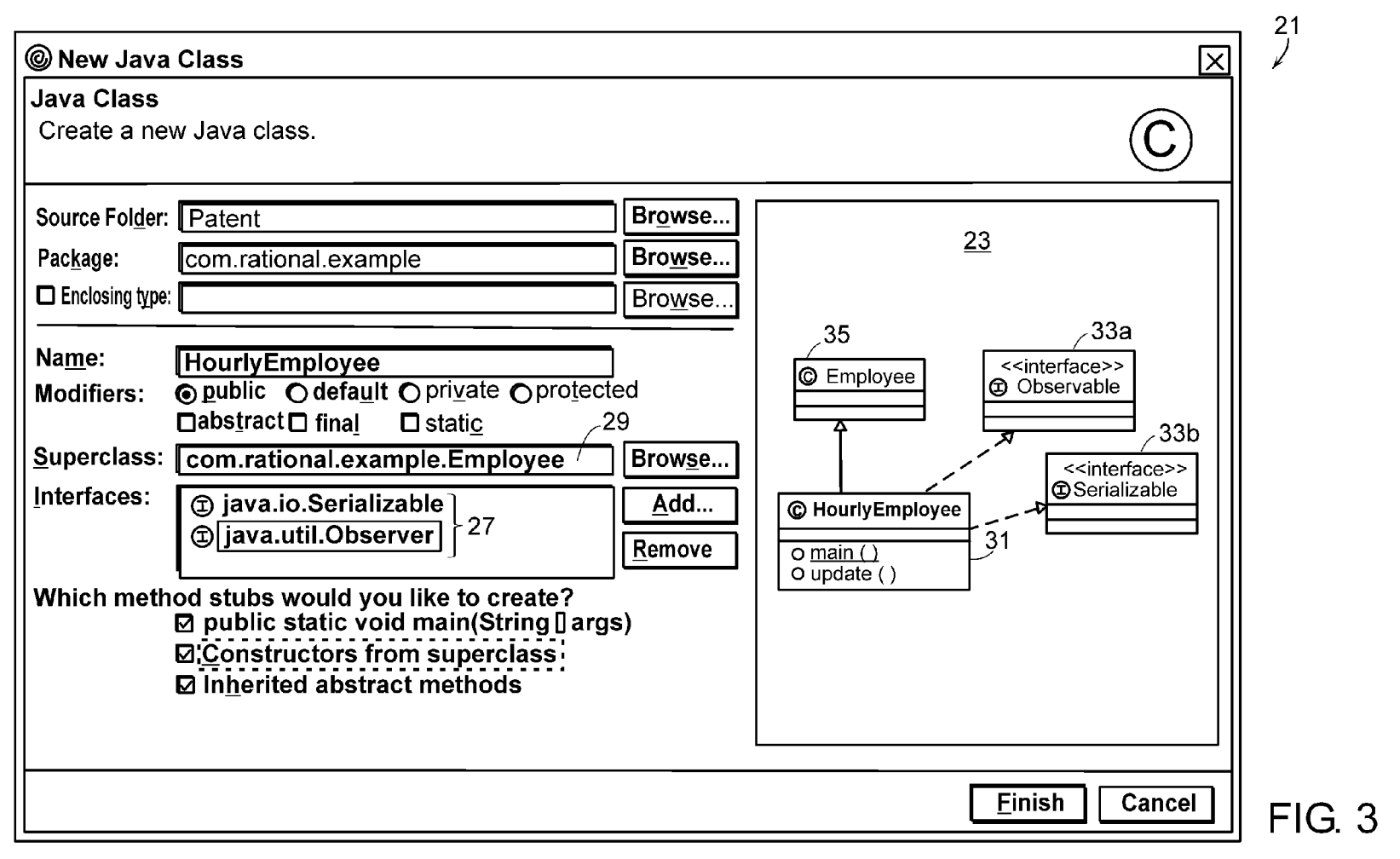

To encourage wider usage of UML, Applicant ensures that the present invention approach makes it as easy as possible for users to learn UML and the mapping between UML and specific implementation languages. In particular, the present invention provides ways in which the UML necessary to represent a mapping between UML and a specific implementation language is generated automatically for the user. FIGS. 1 through 3 are illustrative.

Illustrated in FIG. 1 is an integrated development environment (IDE) 11 in which the principles of the present invention are implemented. Within IDE 11 are wizards 13a, b . . . n. Each wizard 13 is directed to a respective implementation language, and as such prompts the user for language specific details (as will be detailed in FIGS. 2 and 3).

Coupled to each wizard 13 is a respective UML language mapper 15. For a given wizard 13, the respective UML language mapper 15 provides the mapping between UML and the respective implementation language of the wizard 13. Example mappers 15 are:

UML and C++—see "UML and C++: A Practical Guide to Object-Oriented Development," 2nd Ed. by Richard Lee, William Tepfenhart, November 2000 (Prentice Hall publisher);

UML and Visual Basic—see "Developing Applications with Visual Basic and UML" in the Addison-Wesley Object Technology Series, 1st. Ed., by Paul R. Reed, November 1999 (Addison-Wesley Publishing Co.); and UML and J2EE—see "Developing Enterprise Java Applications with J2EE and UML," by Khawar Zaman Ahmed and Cary E. Umrysh, December 2001 (Addison-Wesley Publishing Co.)

For a given wizard 13, the wizard 13 prompts the user for language specific details. In turn, the user enters appropriate input with respect to the implementation language supported by the wizard 13. Responsive to this user input, wizard 13 generates code in the respective implementation language. The mapper 15 coupled to wizard 13 receives the generated code and produces a corresponding UML representation of the generated code. That is, mapper 15 translates from the implementation language of the generated code to UML and draws the corresponding UML diagram for the code.

The mapper 15 outputs (displays to the user) the UML diagram corresponding to the wizard generated code in real time, i.e., during user input to and operation of the wizard 13. As a result, the user is provided with an automated visual depiction of his coding work using UML. In a preferred embodiment, the automated visual depiction (in UML) is displayed side by side with the wizard prompts responsible for producing the subject code. FIGS. 2 and 3 are illustrative.

With reference to FIG. 2, when working with a wizard 13 within an IDE 11, a user is presented with a UML visual depiction of the language specific construct that is being specified. The UML visual depiction is preferably displayed in a panel 23 within the wizard screen 21 and is updated in a real-time fashion as the user enters/inputs details within the wizard 13. In the illustrated example, a Java class creation wizard prompts the user for name of the new class, superclass and inheritance (selected by the user). Upon the user typing in "HourlyEmployee" in the name field 25 of the wizard screen 21, the present invention displays in adjacent panel 23 a UML element 31 representing a Java class, with the name "HourlyEmployee".

As the user specifies some interfaces 27 in the wizard screen 21, the invention system displays in panel 23 the corresponding UML visual depiction of the interface (e.g., "Observable" and "Serializable") 33 as shown in FIG. 3. Likewise, as the user specifies superclass " . . . Employee" 29 in wizard screen 21 (with respect to the Java language), the invention system displays in panel 23 the UML diagram updated in real time accordingly. That is, the UML element "Employee" 35 and its class relation to UML element "Hourly Employee 31" are depicted in UML terms.

On the last screen of the wizard 13, a final version of the UML diagram is presented summarizing the results of the wizard 13. The user is provided with an option to save the diagram within his project. If during the course of the wizard workflow, the user changes an attribute that has been specified (in the implementation language side), the UML diagram is updated in the UML panel 23 side to reflect the current status of the wizard 13 and its corresponding screens 21. This allows the user to see the impact (in UML terms) of the choices that have been made within the wizard 13. With such visual depiction, side by side and in real time with the wizard language specification, the present invention assists the user in learning UML.

Types of wizards that are currently found include: EJB, Class, Access Bean—and many others. The present invention solution applies to all types of wizards across any programming language that can be represented using UML or a subject modeling language.

Figure 4:
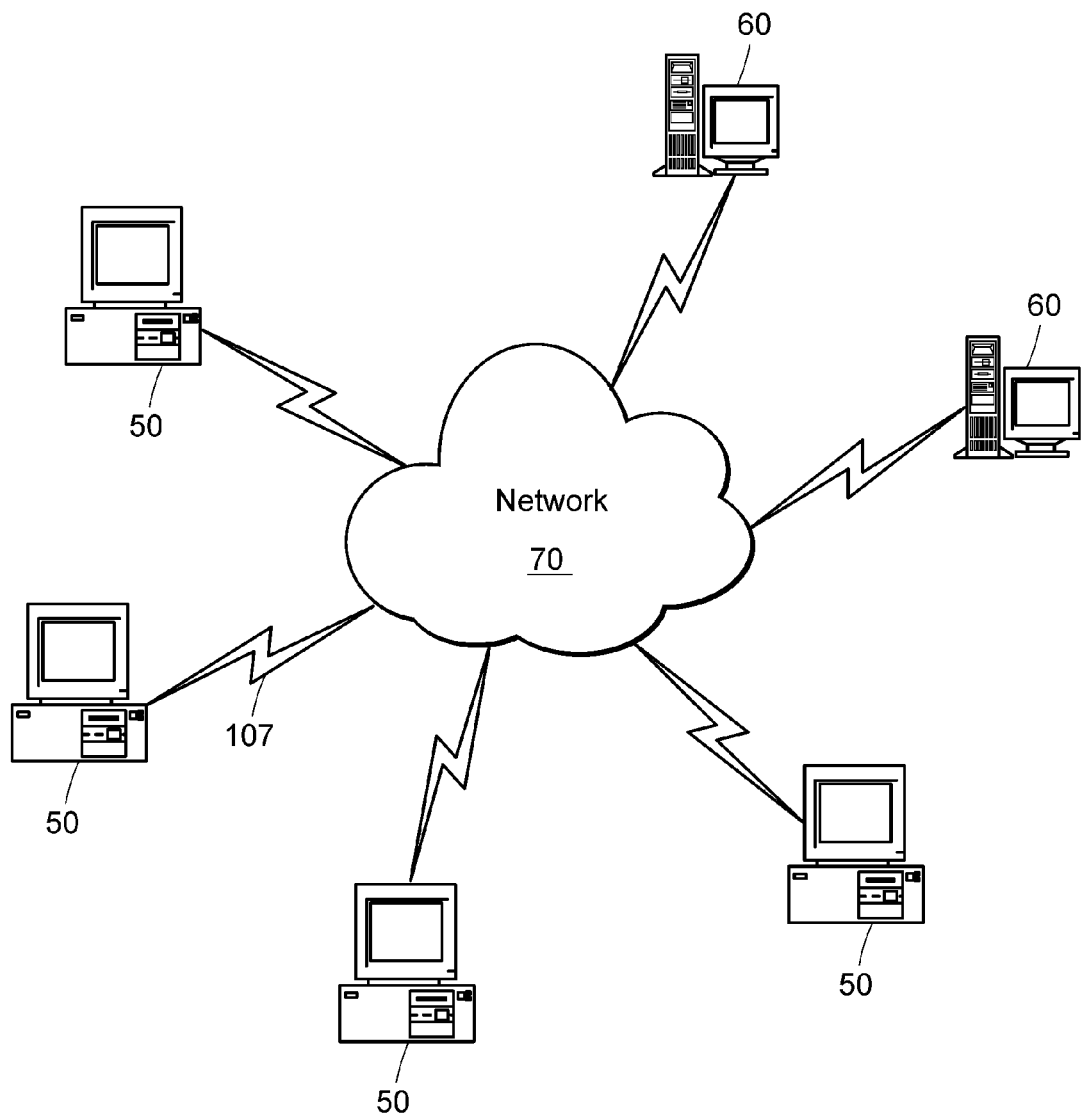
FIG. 4 is a schematic illustration of a computer network environment in which embodiments of the present invention may be practiced.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
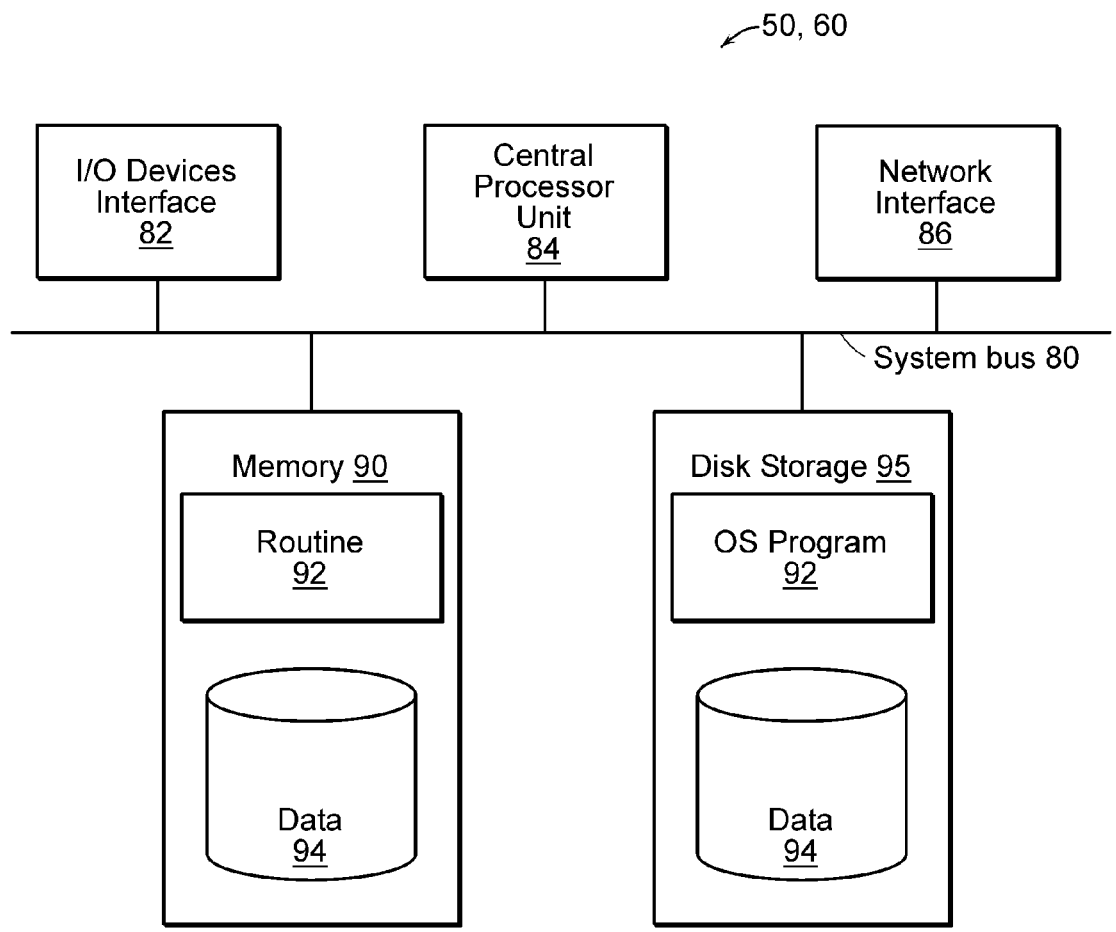
FIG. 5 is a block diagram of a computer of the network of FIG. 4.

FIG. 5 is a diagram of the internal structure of a computer (e.g., client processor/device 50 or server computers 60) in the computer system of FIG. 4. Each computer 50, 60 contains system bus 80, where a bus is a set of hardware lines used for data transfer among the components of a computer or processing system. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions (e.g., Program Routines 92 and Data 94) used to implement an embodiment of the present invention as described above. Disk storage 95 provides non-volatile storage for computer software instructions 92 and data 94 used to implement an embodiment of the present invention. Central processor unit 84 is also attached to system bus 80 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, other modeling languages instead of UML may be the target of translation from the subject programming implementation language. Elements 31, 33, 35 in panel 23 would thus be drawn in that modeling language in a manner similar to that described above for UML.

In another example, the present invention may be employed in an Application Developer for WebSphere Software or the like. In such an embodiment, the user fills out a code focused wizard and can later view the UML depiction by taking the code and adding it to a visualization. The user is able to work in code, and visualize—but the two constructs are not connected during the wizard and the user must choose (make a user command or selection) to see the visualization.

As discussed previously, in certain embodiments of this invention, bringing the visualization into the wizard workflow is preferred. In this other embodiment described in the Application Developer workflow, the user must seek out the UML visualization. In addition, there is no real time connection between the wizard option selections and what is visualized. The user just gets to see (upon user command, for instance) the result of what the code wizard generated. The user can update the code and re-visualize, but again it happens outside of or not so closely coupled to the wizard workflow.

What is claimed is:

1. A computer method for interactively teaching a modeling language to a user, comprising the steps of:
   prompting a user to enter user specifications of a language specific construct into a wizard, the user specification being with respect to an implementation language of the language specific construct, wherein the wizard displays a plurality of user selectable options for defining the language specific construct;
   providing a mapper, the mapper (i) mapping from the implementation language of the language specific construct to a modeling language, and (ii) producing, in terms of the modeling language, a depiction of code expected to be generated from the language specific construct, wherein the expected to be generated code is code that would be generated in the implementation language according to which options are selected by the user in the wizard; and
   interactively teaching the modeling language to the user by:
   (i) coupling the mapper to the wizard for translating the implementation language of the language specific constructs, said coupling enabling modeling language depictions to be displayed in real-time relative to wizard workflow; and
   (ii) interactively illustrating to the user, in real-time, a relationship between parts of the expected to be generated code and modeling language terms.

2. A computer method as claimed in claim 1 wherein the modeling language is UML; and
   the step of coupling enables UML depictions to be displayed during wizard workflow.

3. A computer method as claimed in claim 1 whererein interactively illustrating includes:
   during wizard workflow, displaying, to the user, the modeling language depiction of expected-to-be generated code and corresponding wizard prompts responsible for producing said code in response to user input.

4. A computer method as claimed in claim 3 wherein interactively illustrating includes:
   during wizard workflow, updating and displaying the modeling language depiction of expected-to-be generated code and corresponding wizard prompts responsible for producing said code in response to further user input.

5. A computer method as claimed in claim 1 wherein said coupling enables modeling language depictions to be displayed as part of screen views of the wizard.

6. Computer apparatus for interactively teaching a modeling language to a user, comprising:
   a wizard executed by a processor and prompting a user to specify language-specific constructs in a respective implementation language, the wizard displaying, during wizard workflow, a depiction of the language-specific constructs translated into a modeling language, such that a display means displays the modeling language depiction, wherein the wizard displays a plurality of user selectable options for defining the language-specific construct; and
   a mapper coupled to the wizard and receiving the language-specific constructs from the wizard, the mapper producing, in terms of the modeling language, a depiction of expected subject code corresponding to the language-specific constructs, wherein the expected subject code is code that would be generated in the implementation language according to which options are selected by the user in the wizard;
   wherein the mapper is coupled to the wizard in a manner that interactively illustrates to the user relationships between parts of the expected subject code and modeling language terms.

7. Computer apparatus as claimed in claim 6 wherein the modeling language is UML, and the mapper produces UML depictions.

8. Computer apparatus as claimed in claim 6 wherein the mapper coupled to the wizard interactively teaches the modeling language includes displaying through the display means, in real-time throughout screens of the wizard, the modeling language depiction and corresponding wizard prompts responsible for producing the expected subject code in response to user input.

9. Computer apparatus as claimed in claim 8 wherein the mapper coupled to the wizard further interactively illustrates a relationship between parts of the expected subject code and modeling language terms by updating and displaying through the display means, in real-time, the produced depiction and corresponding wizard prompts responsible for generating the expected subject code in response to further user input.

10. Computer apparatus as claimed in claim 6 wherein said display means includes a pane embedded in the screens of the wizard.

11. Computer apparatus as claimed in claim 6 wherein the mapper and display means enable display of the modeling language depiction upon user command within or outside of the wizard.

12. A computer program product comprising a computer-readable storage medium encoded with computer readable code for controlling a processor to interactively teach a modeling language to a user, by carrying out the steps of:
within a wizard for specifying language-specific constructs in a respective implementation language, during wizard workflow:
 (a) prompting a user to enter user specifications of a language-specific construct, the user specifications being with respect to the respective implementation language, wherein the wizard displays a plurality of user selectable options for defining the language-specific construct;
 (b) mapping from the implementation language of the language-specific constructs to a modeling language, and producing in terms of the modeling language a depiction of expected code in the implementation language in accordance with the user specifications, wherein the expected code is code that would be generated in the implementation language according to which options are selected by the user in the wizard;
 (c) interactively teaching the modeling language to the user by (i) coupling the mapping to wizard workflow, said coupling enabling modeling language depictions to be displayed in real-time relative to wizard workflow and (ii) interactively illustrating in real-time a relationship between parts of the expected code and modeling language terms; and
 (d) including in the interactive illustrating, in real-time, displaying the produced modeling language depiction and corresponding wizard prompts responsible for producing the expected code in response to user input;
the steps of (c) and (d) interactively illustrating to the user relationships between parts of the expected code and modeling language terms.

13. A computer program product as claimed in claim 12 wherein the modeling language is UML.

14. A computer program product as claimed in claim 12 further comprising carrying out the step of:
 (e) including in the interactive illustrating, in real-time, updating the modeling language depiction and corresponding wizard prompts responsible for producing the expected code in response to further user input.

15. A computer program product as claimed in claim 14 further comprising carrying out the step of:
 (f) including in the interactive illustrating, in real-time, displaying to the user the updates to the modeling language depiction and corresponding wizard prompts responsible for producing the expected code.

16. A computer program product as claimed in claim 15 wherein the steps of (d) and (f) displaying include displaying the produced modeling language depiction and updates thereto throughout wizard workflow.

17. A computer program product as claimed in claim 15 wherein the step of (f) displaying includes displaying the produced modeling language depiction upon user command within or outside of the wizard.

18. A computer method for interactively teaching translation from language-specific constructs to a modeling language, comprising the steps of:
within a wizard for specifying language-specific constructs in a respective implementation language, during wizard workflow:
 (a) prompting a user to enter user specifications of a language-specific construct, the user specifications being with respect to the respective implementation language, wherein the wizard displays a plurality of user selectable options for defining the language-specific construct;
 (b) mapping from the implementation language of the language-specific constructs to a modeling language, and producing in terms of the modeling language a depiction of expected code in the respective implementation language in accordance with the user specifications, wherein the expected code is code that would be generated in the implementation language according to which options are selected by the user in the wizard;
 (c) interactively teaching the modeling language to the user by (i) coupling the mapping to wizard workflow, said coupling enabling modeling language depictions to be displayed in real-time relative to wizard workflow and (ii) interactively illustrating to the user in real-time a relationship between parts of the expected code and modeling language terms; and
 (d) including in interactive illustrating to the user, in real-time, interactively displaying the produced modeling language depiction and corresponding wizard prompts responsible for producing the expected code in response to user input;
said steps of (c) and (d) interactively showing to the user translation from language specific constructs to the modeling language.

19. A computer method as claimed in claim 18 wherein the modeling language is UML.

20. A computer method as claimed in claim 18 further during wizard workflow:
 (e) including in the interactive illustrating, in real-time, updating the modeling language depiction and corresponding wizard prompts responsible for producing the expected code in response to further user input.

21. A computer method as claimed in claim 18 wherein the step of displaying includes displaying the produced modeling language depiction and updates thereto throughout wizard workflow.

22. A computer method as claimed in claim 18 wherein the step of displaying includes displaying the produced modeling language depiction upon user command within or outside of the wizard.

23. A computer method as claimed in claim 18 further comprising during wizard workflow:
 (f) including in the interactive illustrating, in real-time, displaying updates to the modeling language depiction and corresponding wizard prompts responsible for producing the expected code to the user.

* * * * *